(12) United States Patent
Matsufuji et al.

(10) Patent No.: US 6,364,045 B1
(45) Date of Patent: Apr. 2, 2002

(54) FRONT WHEEL DRIVE CLUTCH FOR TRACTORS

(75) Inventors: Mizuya Matsufuji, Sanda; Takumi Fujita, Itami, both of (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 09/685,634

(22) Filed: Oct. 10, 2000

(30) Foreign Application Priority Data

Dec. 28, 1999 (JP) .......................................... 11-372647

(51) Int. Cl.$^7$ ........................ B60K 17/34; F16D 19/00; F16D 25/00
(52) U.S. Cl. ................. 180/233; 192/85 AA; 192/91 A
(58) Field of Search ........................... 192/85 AA, 69.8, 192/69.81, 91 R, 91 A; 180/233, 247, 248

(56) References Cited

U.S. PATENT DOCUMENTS

| | | | | |
|---|---|---|---|---|
| 5,794,752 A | * | 8/1998 | Baer et al. ................. | 192/91 A |
| 5,890,574 A | * | 4/1999 | Takahashi ............... | 192/85 AA |
| 6,125,961 A | * | 10/2000 | Matsufuji ................... | 180/247 |
| 6,131,686 A | * | 10/2000 | Scotti et al. .............. | 192/91 A |
| 6,167,995 B1 | * | 1/2001 | Lidner ...................... | 192/91 A |

FOREIGN PATENT DOCUMENTS

| | | |
|---|---|---|
| JP | 52-103252 | 8/1977 |
| JP | 59-192619 | 11/1984 |

* cited by examiner

*Primary Examiner*—Brian L. Johnson
*Assistant Examiner*—Matthew Luby

(57) ABSTRACT

A drive gear (37) having integral drive teeth (37a) is rotatably mounted on a transmission shaft (36) for transmitting power to front wheels, and a movable clutch member (52) having integral driven teeth (52a) engageable with the drive teeth is slidably but non-rotatably mounted on the transmission shaft. A spring (54; 54A) for biasing the movable clutch member into a direction of causing engagement of the driven teeth with the drive teeth is inserted at a part thereof into an axial bore (52b) in the clutch member. A piston (54) is slidably fitted in a cylinder member (55) which is fixedly mounted on the transmission shaft at a radially inward location of the drive and driven teeth. The transmission shaft includes a fluid passage (60) which applies fluid pressure to the piston such that the piston is moved so as to move the movable clutch member into a direction of causing disengagement of the driven teeth from the drive teeth. The front wheel drive clutch of this structure is small in the number of parts, is compact in its axial length, and is rich in durability.

2 Claims, 5 Drawing Sheets

FRONT WHEEL DRIVE CLUTCH FOR TRACTORS

FIELD OF THE INVENTION

This invention relates to a front wheel drive clutch for tractors. More particularly, the present invention relates to a front wheel drive clutch provided in a front wheel drive system which is branched from an intermediate position of a rear wheel drive system including left and right brakes for braking left and right rear wheels.

BACKGROUND OF THE INVENTION

When the above-referenced front wheel drive clutch is structured such that it is engaged by the action of a spring while it is disengaged by the action of fluid pressure, the clutch is normally engaged so as to drive the front wheels together with the rear wheels so that the braking force by the left and right brakes is applied also to the front wheels. Thus, even when an engine shutdown or a trouble with respect to the fluid supply system is caused during the running of tractor, free running distance of the vehicle can be shortened by actuating the brakes.

JP, A No. 59-192619 discloses a front wheel drive clutch of the above-referenced type together with a front wheel drive clutch which is engaged by the action of fluid pressure and is disengaged by the action of a spring. The front wheel drive clutch engaged by the action of a spring and disengaged by the action of fluid pressure comprises a clutch housing which is fixedly mounted on a transmission shaft for transmitting power to the front wheels, a drive gear which is rotatably mounted on the transmission shaft and has a boss portion extending into the clutch housing, a plurality of one and the other frictional elements which are slidably but non-rotatably supported respectively by the clutch housing and by the boss portion of drive gear, a slidable cylinder member which is disposed within the clutch housing at one side of the frictional elements, plural leaf springs which are disposed within the clutch housing in series with the slidable cylinder member so as to bias the cylinder member to move in a direction of causing the engagement of frictional elements, a non-slidable piston which is disposed within the slidable cylinder member, and a fluid passage which is perforated in the transmission shaft so as to open into a fluid chamber defined between the slidable cylinder member and non-slidable piston such that the cylinder member is moved away from the frictional elements by fluid pressure applied to the fluid chamber. Thus, the front wheel drive clutch is engaged by the force of leaf springs, which causes the engagement of frictional elements through the movable cylinder member, and is disengaged by fluid pressure which acts upon the cylinder member so as to move away from the frictional elements. This clutch is very lengthy because the plurality of frictional elements, the slidable cylinder member and the leaf springs are arranged in series within the clutch housing. The clutch is also expensive because number of parts including the plurality of frictional elements is large.

JP, U No. 52-103252 discloses a claw clutch which is disposed between coaxially arranged two transmission shafts and which is engaged by the action of a spring and is disengaged by the action of fluid pressure. The claw clutch comprises, within a clutch casing, a fixed clutch member which is fixedly mounted on a transmission shaft of the driven side and has integral driven teeth, a movable clutch member which is slidably but non-rotatably mounted on a transmission shaft of the drive side and has integral drive teeth engageable with the driven teeth, a coil spring which is arranged in series with the movable clutch member and acts upon the movable clutch member to move into a direction of causing the engagement of drive teeth with the driven teeth, a cylinder member which is secured to the clutch casing and by which the movable clutch member is slidably received in a fluid-tight manner through a plurality of seal rings, and a pipe which extends through the clutch casing and opens into the cylinder member such that the movable clutch member is moved into a direction of causing the disengagement of drive teeth from the driven teeth by fluid pressure applied to the movable clutch member through the pipe. This claw clutch is lengthy because the movable clutch member and the coil spring are arranged in series. The claw clutch is particularly poor in durability because the movable clutch member is rotated in contact with the fixed cylinder member so that the seal rings between these members will be damaged with the use of claw clutch.

A primary object of the present invention is to provide a novel front wheel drive clutch of the type engaged by the action of a spring and disengaged by the action of fluid pressure which is small in the number of parts so as to be inexpensive, which is compactly designed in the axial length of clutch, and which is rich in durability because of the absence of relatively rotated two members damaging the fluid tightness.

An attendant object is to provide a novel front wheel drive clutch which is easy in assembling.

SUMMARY OF THE INVENTION

In a tractor comprising a rear wheel drive system which includes left and right brakes (28) for braking left and right rear wheels, the present invention relates to a front wheel drive clutch (38) provided in a front wheel drive system which is branched from an intermediate position of the rear wheel drive system. According to the present invention, the front wheel drive clutch comprises:

drive teeth (37a) integral with a drive gear (37) which is rotatably mounted on a transmission shaft (36) for transmitting power to the front wheels;

driven teeth (52a) integral with a movable clutch member (52) which is slidably but non-rotatably mounted on the transmission shaft (36), the driven teeth being engageable with the drive teeth (37a);

a spring (54; 54A) inserted at a portion thereof into a bore (52b) which is formed in the movable clutch member (52) along the axial length thereof, the spring abutting against the movable clutch member to bias the clutch member to move into a direction of causing the engagement of the driven teeth (52a) with the drive teeth (37a);

a cylinder member (55) fixedly mounted on the transmission shaft (36), the cylinder member being disposed radially inwardly of the drive teeth (37a) and the driven teeth (52a);

a piston (57) slidably fitted in the cylinder member (55), the piston abutting against the movable clutch member (52) so as to move the clutch member into a direction of causing the disengagement of the driven teeth (52a) from the drive teeth (37a); and a fluid passage (60) formed in the transmission shaft (36) so as to open into an inside of the cylinder member (55), the fluid passage being operable to apply fluid pressure to the piston (57) and to thereby move the piston into the direction of causing the disengagement of the driven teeth (52a) from the drive teeth (37a).

Because the front wheel drive clutch according to the present invention is structured such that the driven teeth (52a) is engaged with the drive teeth (37a) by the biasing force of spring (54; 54A) and is disengaged from the drive teeth by the sliding movement of movable clutch member (52) caused by the action of fluid pressure applied to the piston (57), the clutch is engaged by the action of a spring and is disengaged by the action of fluid pressure. The front wheel drive clutch, which is engaged and disengaged by the engagement and disengagement between the drive teeth (37a) and the driven teeth (52a), is small in the number of parts because of the non-employment of a plurality of frictional elements, so that it can be manufactured inexpensively in spite of the fact that it can be operated lightly by means of a fluid supply system in the same manner as the clutch having a plurality of frictional elements. Because a plurality of frictional elements are not employed, because the cylinder member (55) is fixedly mounted on the transmission shaft (36) at a radially inward location of the drive teeth (37a) and driven teeth (52a), and because the spring (54; 54A) is inserted at a portion thereof into the axial bore (52b) formed in the movable clutch member (52), the front wheel drive clutch according to the present invention can be designed in a compact manner in the axial direction of clutch. Further, because the cylinder member (55) fixedly mounted on the transmission shaft (36) is rotated together with the movable clutch member (52) which is non-rotatably mounted on the transmission shaft and because the piston (57) fitted in the cylinder member (55) is, of course, rotated together with the cylinder member so that relative rotation is not caused between the piston and the cylinder member, there are no members which may cause a damage of seal rings or fluid tightness, so that the durability of clutch is enhanced.

According to a preferred embodiment of the present invention, the transmission shaft (36) extends axially of the tractor and is rotatably supported by a clutch casing (50) which is secured to a bottom wall of a transmission case (48) of the tractor with an opening in the bottom wall being closed by the clutch casing, and the clutch casing (50) is provided with an integral support portion (50a), which is inserted into the transmission casing (48) through the opening (49) and which supports gears (32, 33) for transmitting power to the drive gear (37), and a cover plate (50c) which closes a front end opening (50b) of the clutch casing (50) and which supports a front end portion of the transmission shaft (36). Further, the front end opening (50b) is sized such that the drive gear (37) and the movable clutch member (52) can pass through the front end opening.

According to this structure, the gears (32, 33) for transmitting power to the drive gear (37) need not be supported by a separate support member supported by the transmission case (48) and the gears (32, 33) can be assembled into the transmission case at a same time when the clutch casing (50) is secured to the bottom wall of the transmission case. Further, the front wheel drive clutch can be assembled very easily. That is, the front wheel drive clutch can be assembled onto the transmission shaft (36) at an outside of the clutch casing (50) and, then, the transmission shaft having thereon the front wheel drive clutch is inserted into the clutch casing (50), having been secured to the bottom wall of the transmission case (48) with the gears (32, 33) supported by the support portion (50a), through the front end opening (50b) which permits passing of the drive gear (37) and movable clutch member (52). The assembly of front wheel drive clutch is then completed by securing the cover plate (50c) to the clutch casing so as to close the front end opening (50b).

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
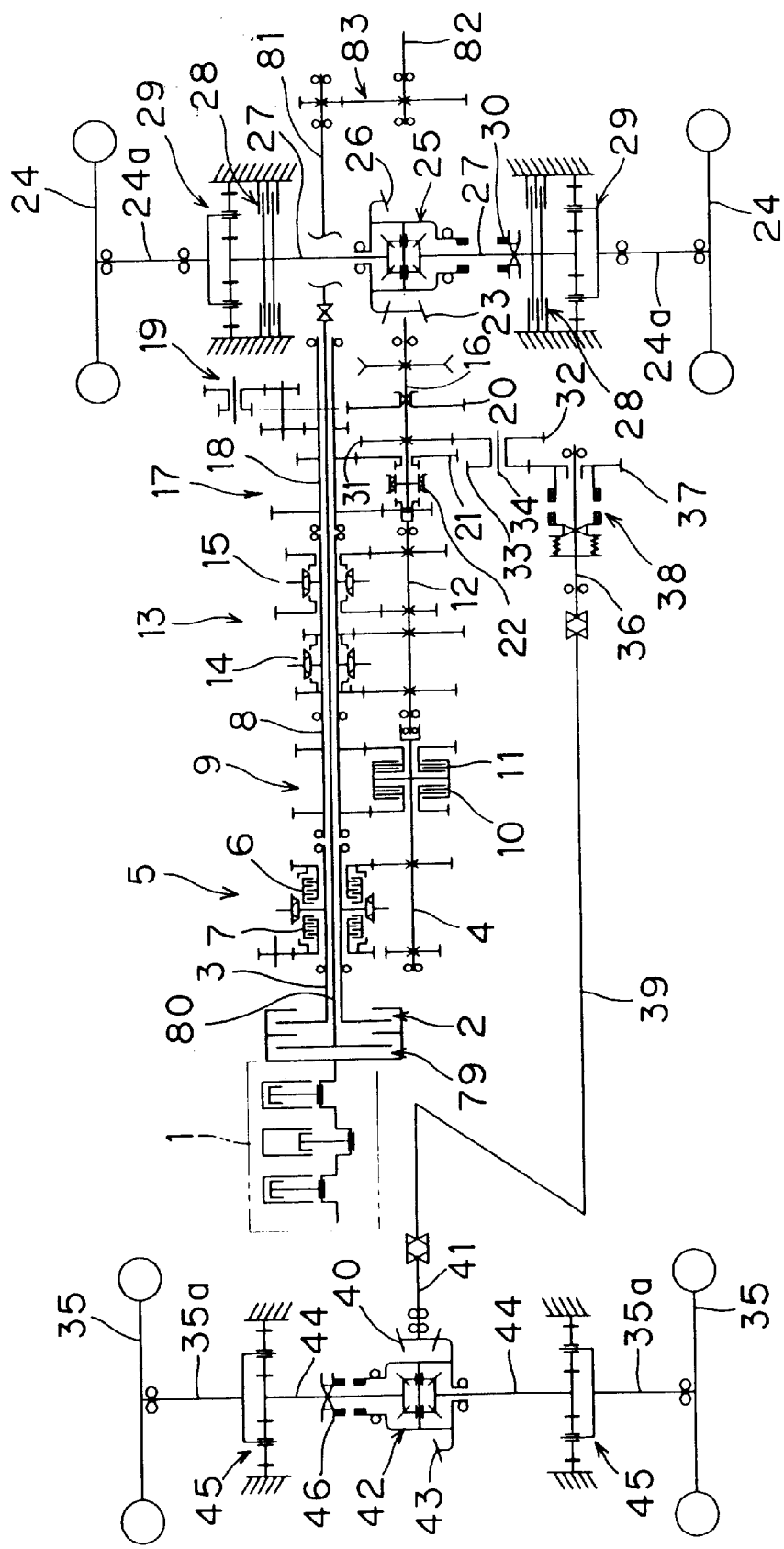
FIG. 1 is a diagram showing a transmission system employed in a tractor in which a front wheel drive clutch according to an embodiment of the present invention is employed.

FIG. 1 depicts the transmission mechanism of a tractor in which a preferred embodiment of the present invention is employed. There is provided a hollow drive shaft 3 which is connected to an engine 1 through a main clutch 2. An output shaft 4 is disposed below the drive shaft 3, and a direction-reversing mechanism 5 for driving the output shaft 4 to rotate selectively into a forward or backward direction is arranged between the drive shaft 3 and the output shaft 4. The reversing mechanism 5 comprises a forward directional synchronizer clutch 6 and a backward directional synchronizer clutch 7 which are disposed on the drive shaft 4. The output shaft 4 extends rearwardly, and a hollow transmission shaft 8 is disposed behind and coaxially with the drive shaft 3. A high/low speed-selecting mechanism 9 for providing the transmission shaft 8 selectively with a high or low rotational speed is arranged between the output shaft 4 and the transmission shaft 8. The selecting mechanism 9 comprises a high speed fluid-operated clutch 10 and a low speed fluid-operated clutch 11 which are disposed on the output shaft 4.

The transmission shaft 8 extends rearwardly, and a driven shaft 12 is disposed behind and coaxially with the output shaft 4. A mechanical speed change mechanism 13 for driving the driven shaft 12 to rotate selectively at any one of four speed-change ratios is arranged between the transmission shaft 8 and the driven shaft 12. The mechanical speed change mechanism 13 comprises two double-acting synchronizer clutches 14 and 15 which are disposed on the transmission shaft 8. A propeller shaft 16 is disposed behind and coaxially with the driven shaft 12, and another mechanical speed change mechanism 17 for driving the propeller shaft 16 to rotate selectively at any one of four speed-change ratios is arranged between the driven shaft 12 and the propeller shaft 16. The mechanical speed change mechanism 17 includes a hollow counter shaft 18, which is disposed behind and coaxially with the transmission shaft 8 and is driven to rotate by the driven shaft 12, and a speed-changing gear which is connected to the counter shaft 18 through a speed-reduction gearing 19. On the propeller shaft 16, there are mounted a shift gear 20 which is meshed selectively with the above-referenced speed-changing gear and with another speed-changing gear on the counter shaft 18, and a double-acting clutch 22 which is shifted selectively to a position where a rotatable gear 21 meshing with another speed-changing gear on the counter shaft 18 is coupled to the propeller shaft 16 and to another position where the propeller shaft 16 is coupled directly to the driven shaft 12.

The propeller shaft 16 has, at its rear end, a bevel pinion 23 which is meshed with a larger input bevel gear 26 of a differential gearing 25 for left and right rear wheels 24. Left and right output shafts 27 of the differential gearing 25 are associated with left and right brakes 28 which are operable to brake the left and right rear wheels 24, and the left and right output shafts 27 are connected to the left and right rear wheel axles 24a through left and right speed-reduction devices 29 of a planetary gear type. A differential locking clutch 30 for selectively disabling the differential gearing 25 is mounted on one of the output shafts 27.

On the propeller shaft 16 which constitutes a final shaft of the speed change assembly for the rear wheel drive system, there is fixedly mounted a gear 31 for taking-off the driving power for front wheels. The front wheel drive system comprises integral larger and smaller gears 32 and 33 which are rotatably mounted on a support shaft 34 with the larger gear 32 being meshed with the gear 31 on the propeller shaft, a drive gear 37 which is rotatably mounted on a transmission shaft 36 for transmitting power to the left and right front wheels 35 and which is meshed with the smaller gear 33 on the support shaft, and a front wheel drive clutch 38 which is mounted on the transmission shaft 36. The transmission shaft 36 is coupled to another transmission shaft 39 which is lengthy in the longitudinal direction of the tractor, and the transmission shaft 39 is coupled to a further transmission shaft 41 having a bevel pinion 40 at its front end. The bevel pinion 40 is meshed with a larger input bevel gear 43 of a differential gearing 42 for the left and right front wheels 35, and left and right output shafts 44 of the differential gearing 42 are connected to left and right front wheel axles 35a through left and right speed-reduction gearings 45 of a planetary gear type. A differential locking clutch 46 for selectively disabling the differential gearing 42 is mounted on one of the output shafts 44.

Figure 2:
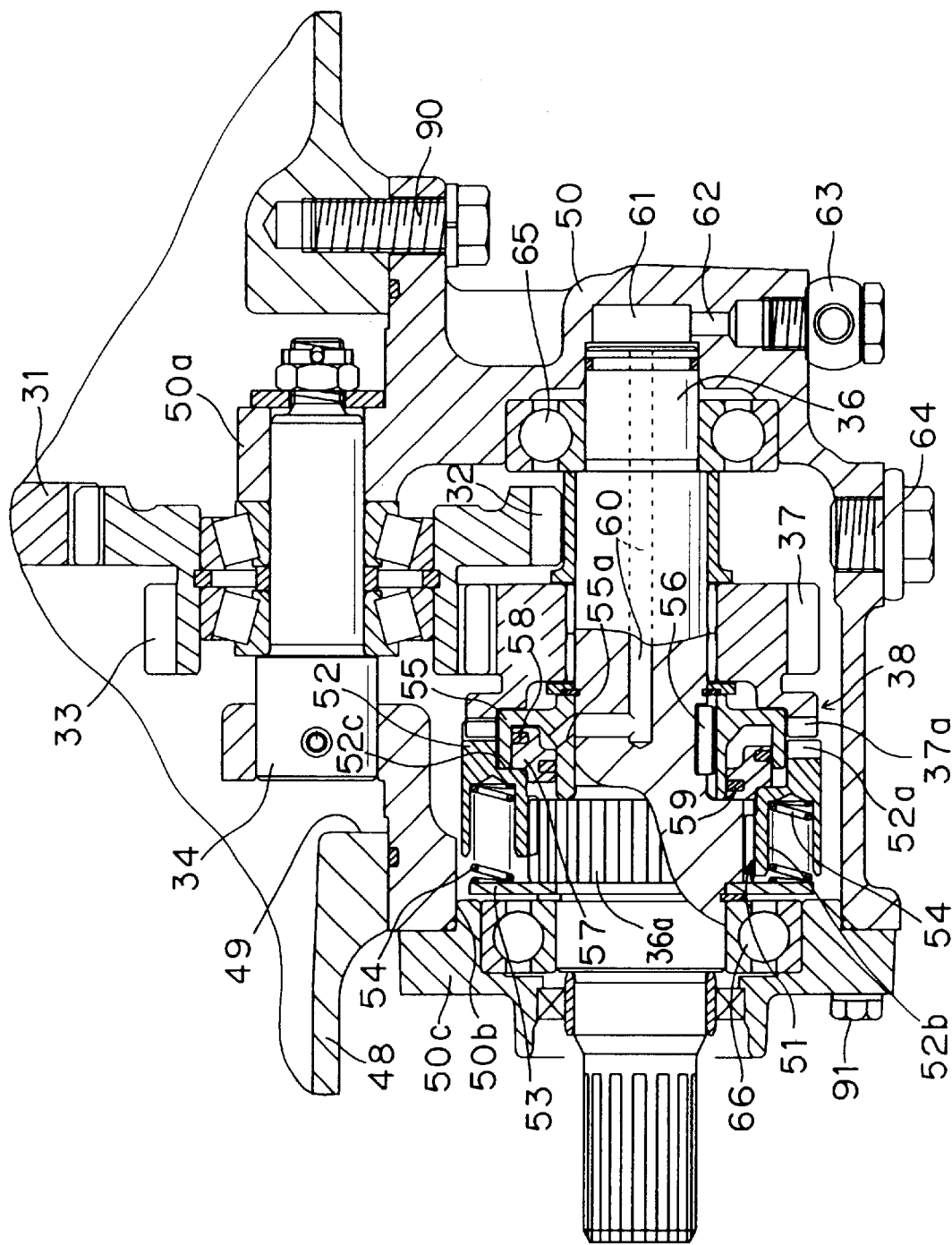
FIG. 2 is a sectional side view of the front wheel drive clutch.
Figure 3:
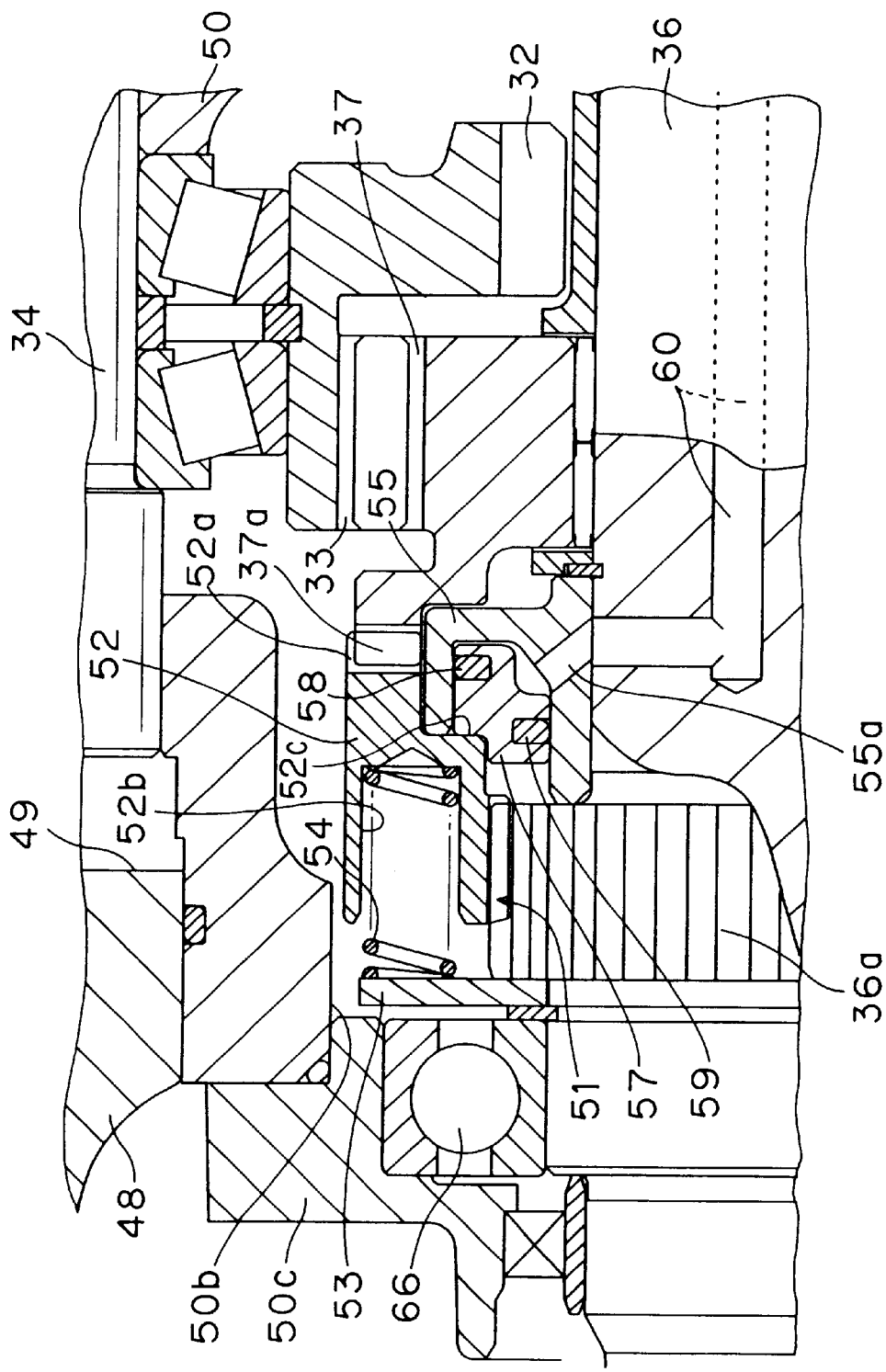
FIG. 3 is an enlarged sectional side view of a part of FIG. 2.

Structure of the front wheel drive clutch 38 is shown in great detail in FIGS. 2 and 3. In these figures, numeral 48 designates a transmission case which houses the mechanical speed change mechanisms 13 and 17 shown in FIG. 1. The transmission case 48 has, at its bottom wall, an opening 49 which is closed by a clutch casing 50 secured to the bottom wall using bolts 90. The clutch casing 50 has an integral support portion 50a which extends into the transmission case 48 through the opening 49, and the above-referenced support shaft 34 is fixedly supported by the support portion 50a. The above-referenced transmission shaft 36 is rotatably supported by the clutch casing 50 and by a cover plate 50c, which closes a front end opening 50b of the clutch casing, and extends forwardly of the cover plate 50c. The above-referenced drive gear 37 is rotatably mounted on the transmission shaft 36 through a needle bearing and is meshed with the smaller gear 33 on the support shaft 34. The cover plate 50c is detachably secured to the clutch casing 50 using bolts 91.

A movable clutch member 52 is slidably but non-rotatably mounted on the drive shaft 36 by means of a splined connection 51 using an enlarged splined portion 36a of the drive shaft. The front wheel drive clutch 38 is composed of a claw clutch comprising drive teeth 37a, which are formed integrally in a boss portion of the drive gear 37, and driven teeth 52a which are formed integrally in the movable clutch member 52 and can be engaged with the drive teeth 37a. The movable clutch member 52 includes a plurality (five, for example) of bores 52b which extend along the axial direction of drive shaft 36 and open at the opposite side of drive gear 37. A plurality of coil springs 54, which are received at their base ends by a ring 53 mounted non-slidably on the drive shaft 36, extend into the bores 52b and abut at their extreme ends against the movable clutch member 52 so as to bias the movable clutch member to slide into a position where the driven teeth 52a are engaged with the drive teeth 37a, as shown in an upper side of FIG. 2 and in FIG. 3.

At a rear side of the enlarged splined portion 36a, there is fixedly mounted on the drive shaft 36, using a key 56, a cylinder member 55 which is positioned radially inwardly of the drive and driven teeth 37a and 52a. In the cylinder member 55 having an open front end, a piston 57 is slidably fitted in a fluid-tight manner using seal rings 58 and 59 in the outer and inner circumferential surfaces of piston 57. The piston 57 abuts against an annular shoulder 52c of the movable clutch member 52, formed at an inner circumferential surface of the clutch member, such that when the piston 57 is actuated the movable clutch member 52 is displaced into a direction of disengaging the driven teeth 52a from the drive teeth 37a, as shown in a lower side of FIG. 2.

The transmission shaft 36 includes in it a fluid passage 60 which opens at its rear end into a fluid chamber 61 formed within the clutch casing 50 and at its front end into the cylinder member 55 through a fluid passage bore 55a in the cylinder member 55. The piston 57 is displaced forwardly by fluid pressure applied through the fluid passage 60 whereby the driven teeth 52a are disengaged from the drive teeth 37a. The clutch casing 50 includes a fluid passage 62 communicating with the fluid chamber 61, and a fitting 63 is secured to the clutch casing 50 for connecting a fluid piping to the fluid passage 62. In a bottom wall of the clutch casing 50, an opening for getting lubricant into and out of the clutch casing 50 is provided and is closed by a threaded plug 64.

Support portion 50a of the clutch casing 50 is adapted to be placed into the transmission case 48 through the opening 49 in a condition where the support shaft 34 and gears 32 and 33 are supported by the support portion 50a, and then the clutch casing 50 is secured to the bottom wall of transmission casing 48. A bearing 65 for receiving a rear portion of the transmission shaft 36 has previously been assembled into the clutch casing 50. The transmission shaft 36 having thereon the drive gear 37, movable clutch member 52, coil springs 54 and cylinder member 55 having therein the piston 57 is then assembled into the clutch casing 50 through the opening 50b in a condition where the transmission shaft 36 is supported by the cover plate 50c through a bearing 66, and then the cover plate 50c is secured to the clutch casing 50. For permitting such assembly, the diameter of opening 50b at the front end of clutch casing 50 is made somewhat larger than the outer diameters of drive gear 37 and movable clutch member 52 so that the drive gear 37 and movable clutch member 52 can pass through the opening 50b. Thus, the clutch elements including the drive gear 37 and movable clutch member 52 can be preassembled onto the transmission shaft 36 at an outside of the clutch casing 50. Of course, the inspection and maintenance of the front wheel drive clutch 38 can be made very easily by getting away the bolts 91 and by getting the transmission shaft 36 having thereon the front wheel drive clutch 38 out of the clutch casing 50 together with the cover plate 50c.

Figure 4:
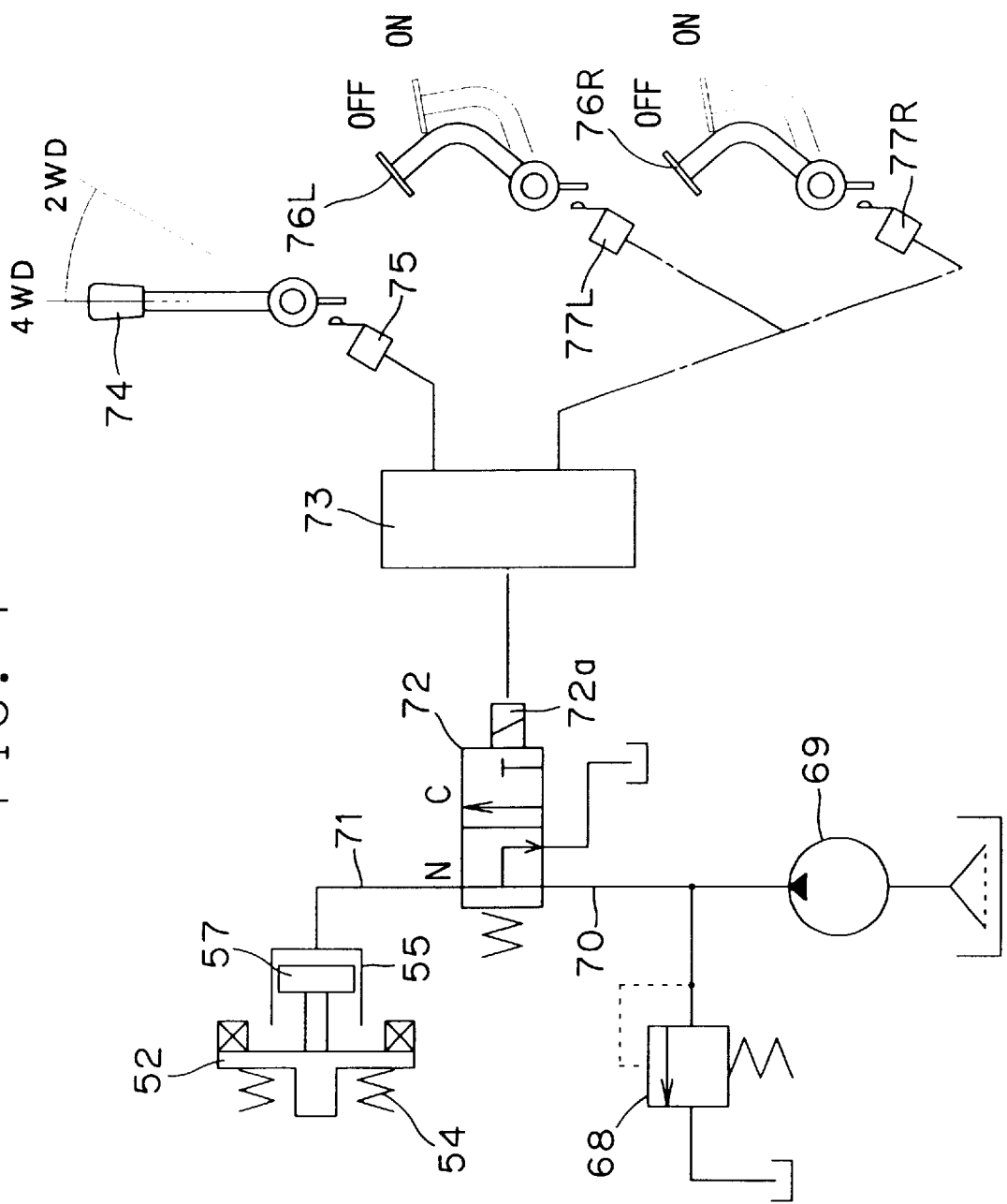
FIG. 4 is a diagram showing a disengaging mechanism for the front wheel drive clutch.

A mechanism for disengaging the front wheel drive clutch 38 is schematically shown in FIG. 4. An electromagnetic directional control valve 72 is provided between an outlet path 70 of a hydraulic pump 69, the fluid pressure in which is determined by a relief valve 68, and a fluid path 71 which includes the above-referenced fluid passage 60 and is connected to the inside of cylinder member 55. The electromagnetic directional control valve 72 has a neutral position N shown where it connects the fluid path 71 to an oil reservoir so that the front wheel drive clutch 38 is engaged due to the force of coil springs 54, and a clutch-disengaging position C where it is displaced by the energization of a solenoid 72a and where it connects the outlet path 70 to the fluid path 71 so that fluid pressure is applied to the piston 57 whereby the front wheel drive clutch 38 is disengaged. A controller 73 is connected to the solenoid 72a, and there is connected to an input side of the controller 73 a switch 75 operated by a front wheel drive lever 74 which is displaced selectively to a four wheel drive position 4WD and to a two wheel drive position 2WD. The switch 75 is turned on at the two wheel drive position 2WD of the front wheel drive lever 74, and the controller 73 energizes the solenoid 72a in the turned-on condition of switch 75 so as to disengage the front wheel drive clutch 38 and to thereby achieve a two wheel drive condition of the tractor.

To the input side of controller 73 are also connected switches 77L and 77R which are operated respectively by left and right brake pedals 76L and 76R for operating the left and right brakes 28 shown in FIG. 1. Each of the switches 77L and 77R is turned on when each brake pedal 76L, 76R is operated from a non-braking position OFF to a braking position ON. The controller 73 is adapted such that, when any one of the switches 77L and 77R is turned on in the turned-on or turned-off condition of the switch 75, it keeps the solenoid 72a in the deenergized or energized condition so as to maintain the four or two wheel drive condition of tractor, whereas, when both of the switches 77L and 77R are turned on, it necessarily deenergizes the solenoid 72a so as to achieve the four wheel drive condition of tractor regardless of the turned-on or turned-off condition of the switch 75. That is, when the left and right brakes 28 are operated so as to brake the tractor, the braking force is necessarily applied also to the left and right front wheels whereby the running distance of vehicle under the braking force is shortened.

The structure of PTO (power take-off) drive system of the tractor shown will be described in reference to FIG. 1. A drive shaft 80, which is connected to the engine 1 through a main clutch 79 of the PTO drive system, extends through the hollow drive shaft 3, transmission shaft 8 and counter shaft 18 and is coupled, at its rear end, to a transmission shaft 81. A PTO shaft 82 is provided which extends rearwardly of the tractor, and a speed-reduction gearing 83 is disposed between the transmission shaft 81 and the PTO shaft 82.

Figure 5:
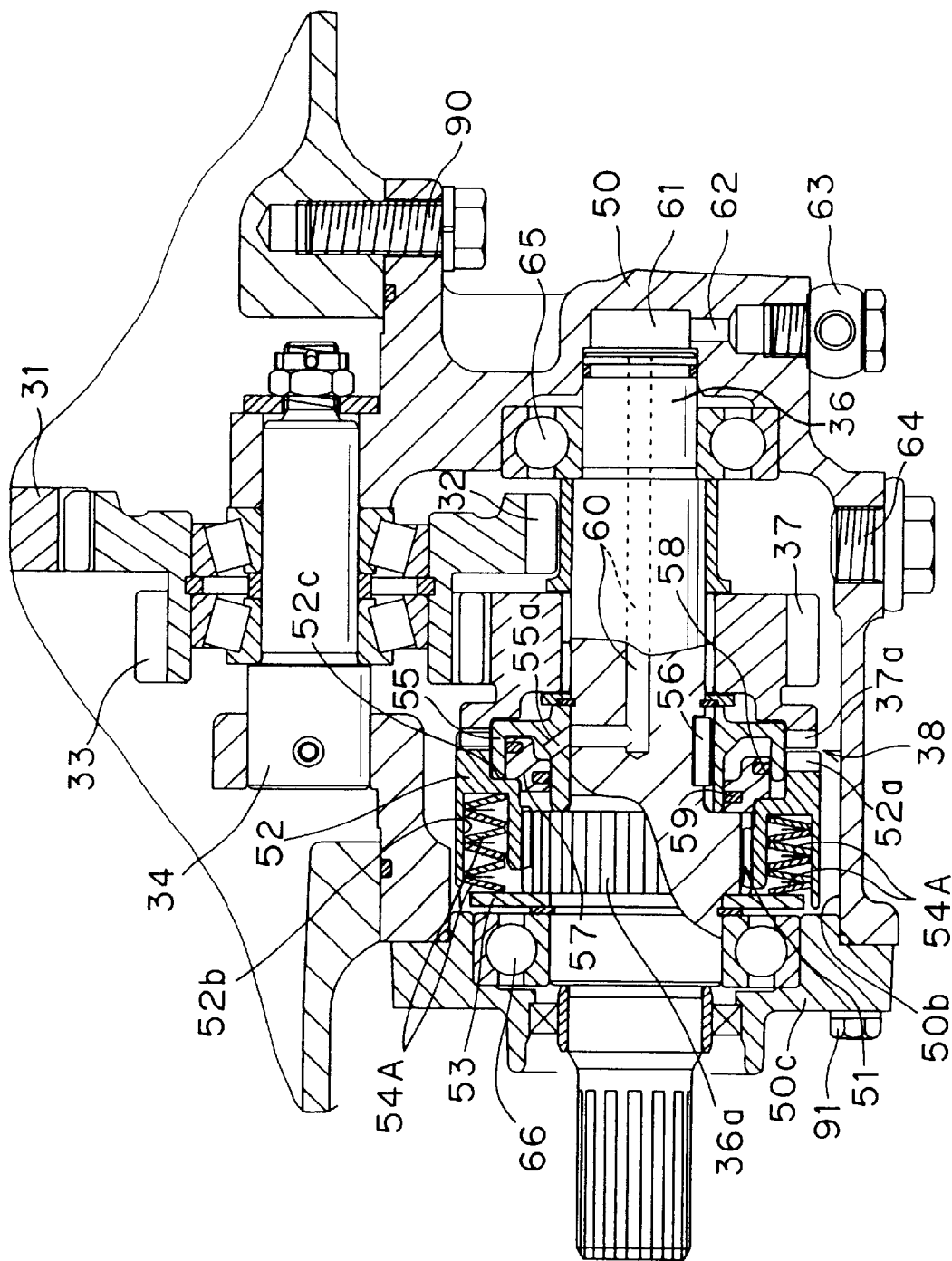
FIG. 5 is a sectional side view of a front wheel drive clutch according to another embodiment of the present invention.

FIG. 5 depicts another embodiment of the present invention in which the movable clutch member 52 is provided with an annular bore 52b which is coaxial with the transmission shaft 36. In place of the above-referenced coil springs 54, plural leaf springs 54A which are received by the ring 53 extend into the annular bore 52b and act upon the movable clutch member 52. The other parts are same as the corresponding parts of the first embodiment.

We claim:
1. In a tractor comprising a rear wheel drive system which includes left and right brakes (28) for braking left and right rear wheels, a front wheel drive clutch (38) provided in a front wheel drive system which is branched from an intermediate position of the rear wheel drive system, comprising:
   drive teeth (37a) integral with a drive gear (37) which is rotatably mounted on a transmission shaft (36) for transmitting power to the front wheels;
   driven teeth (52a) integral with a movable clutch member (52) which is slidably but non-rotatably mounted on said transmission shaft (36), said driven teeth being engageable with said drive teeth (37a);
   a spring (54; 54A) inserted at a portion thereof into a bore (52b) which is formed in said movable clutch member (52) along the axial direction thereof, said spring abutting against said movable clutch member to bias said clutch member to move into a direction of causing the engagement of said driven teeth (52a) with said drive teeth (37a);
   a cylinder member (55) fixedly mounted on said transmission shaft (36), said cylinder member being disposed radially inwardly of said drive teeth (37a) and said driven teeth (52a);
   a piston (57) slidably fitted in said cylinder member (55), said piston abutting against said movable clutch member (52) so as to move said clutch member into a direction of causing the disengagement of said driven teeth (52a) from said drive teeth (37a); and
   a fluid passage (60) formed in said transmission shaft (36) so as to open into an inside of said cylinder member (55), said fluid passage being operable to apply fluid pressure to said piston (57) and to thereby move said piston into said direction of causing the disengagement of said driven teeth (52a) from said drive teeth (37a).

2. The front wheel drive clutch as set forth in claim 1, wherein said transmission shaft (36) extends axially of the tractor and is rotatably supported by a clutch casing (50) which is secured to a bottom wall of a transmission case (48) of the tractor with an opening (49) in said bottom wall being closed by said clutch casing, and wherein said clutch casing (50) is provided with an integral support portion (50a), which is inserted into said transmission casing (48) through said opening (49) and which supports gears (32, 33) for transmitting power to said drive gear (37), and a cover plate (50c) which closes a front end opening (50b) of said clutch casing (50) and which supports a front end portion of said transmission shaft (36), said front end opening (50b) being sized such that said drive gear (37) and said movable clutch member (52) can pass through said front end opening.

* * * * *